(12) United States Patent
Kojima et al.

(10) Patent No.: US 7,709,558 B2
(45) Date of Patent: May 4, 2010

(54) TIRE PUNCTURE SEALANT AND METHOD FOR MAKING

(75) Inventors: Yoshihide Kojima, Kobe (JP);
Masahiro Kishida, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 948 days.

(21) Appl. No.: 11/436,628

(22) Filed: May 19, 2006

(65) Prior Publication Data

US 2006/0209626 A1 Sep. 21, 2006

Related U.S. Application Data

(62) Division of application No. 10/446,850, filed on May 29, 2003, now abandoned.

(51) Int. Cl.
*B29C 73/00* (2006.01)

(52) U.S. Cl. ...................................................... 523/166

(58) Field of Classification Search ................... 523/166
See application file for complete search history.

(56) References Cited

U.S. PATENT DOCUMENTS

| 2,387,488 A | 10/1945 | Acken et al. |
| 2,701,193 A | 2/1955 | Heudier et al. |
| 4,365,988 A | 12/1982 | Graham et al. |
| 4,495,086 A | 1/1985 | Hiroshima et al. |
| 5,782,556 A | 7/1998 | Chu |
| 6,290,386 B1 | 9/2001 | Baumgarti et al. |
| 6,864,305 B2 * | 3/2005 | Kishida et al. ............... 524/386 |
| 6,992,119 B2 * | 1/2006 | Kojima et al. ............... 523/166 |

FOREIGN PATENT DOCUMENTS

| EP | 0 798 140 A2 | 10/1997 |
| EP | 0 846 552 A2 | 6/1998 |
| EP | 1 291 159 A1 | 3/2003 |

\* cited by examiner

*Primary Examiner*—Edward J Cain
(74) *Attorney, Agent, or Firm*—Birch, Stewart, Kolasch & Birch, LLP

(57) ABSTRACT

A device and a method for making a tire puncture sealant having a higher concentration of propylene glycol are disclosed, wherein the device comprises: a container having a cylindrical space for a mixed solution of rubber latex and a tackifier; a squirter comprising at least one spout for pouring propylene glycol on the surface of the mixed solution in the container at a rate of 0.01 to 1.0 liter/minute per spout; and an agitator for the mixed solution in the container, comprising a stirring blade rotatable in the mixed solution to cause said surface a current speed of the mixed solution in a range between about 1.0 and about 10.0 meter/second during pouring the propylene glycol.

9 Claims, 2 Drawing Sheets

TIRE PUNCTURE SEALANT AND METHOD FOR MAKING

CROSS REFERENCE TO RELATED APPLICATIONS

This application is a divisional application of application Ser. No. 10/446,850, filed on May 29, 2003 now abandoned. The entire contents of the above-identified application are hereby incorporated by reference, and priority is claimed under 35 U.S.C. § 120.

BACKGROUND OF THE INVENTION

The present invention relates to a device and a method for making a tire puncture sealant having a higher concentration of propylene glycol.

As a puncture repair system for tubeless auto tires, a sealant injected into a tire cavity through a tire valve is a very easy effective means for the type of crown punctures made by small objects such as nails. In general, a puncture sealant includes rubber latex. If water in the rubber latex is frozen, the rubber globules in the emulsion transform into coagulum. Thus, if the puncture sealant is once frozen before use during keeping in the trunk room or the like, it becomes unusable.

It is therefore, an object of the present invention to provide a device and a method for making a tire puncture sealant by which it becomes possible to make a tire puncture sealant including propylene glycol in a higher concentration to prevent its freezing without difficulty.

According to one aspect of the present invention, a device for making a tire puncture sealant having a higher concentration of propylene glycol, comprises a container having a cylindrical space for a mixed solution of rubber latex and a tackifier, a squirter comprising at least one spout for pouring propylene glycol on the surface of the mixed solution in the container at a rate of 0.01 to 1.0 liter/minute per spout, and an agitator for the mixed solution in the container, comprising a stirring blade rotatable in the mixed solution to cause the above-mentioned surface a current speed of the mixed solution in a range between about 1.0 and about 10.0 meter/second during pouring the propylene glycol.

According to another aspect of the present invention, a method for making a tire puncture sealant having a higher concentration of propylene glycol, comprises preparing a mixed solution of rubber latex and a tackifier in a cylindrical space of a container, pouring propylene glycol on the surface of the mixed solution through a spout at a rate of 0.01 to 1.0 liter/minute per spout, and agitating the mixed solution in the container to cause the above-mentioned surface a current speed of the mixed solution in a range between about 1.0 and about 10.0 meter/second during pouring the propylene glycol.

Embodiments of the present invention will now be described in detail in conjunction with the accompanying drawings.

Figure 1:
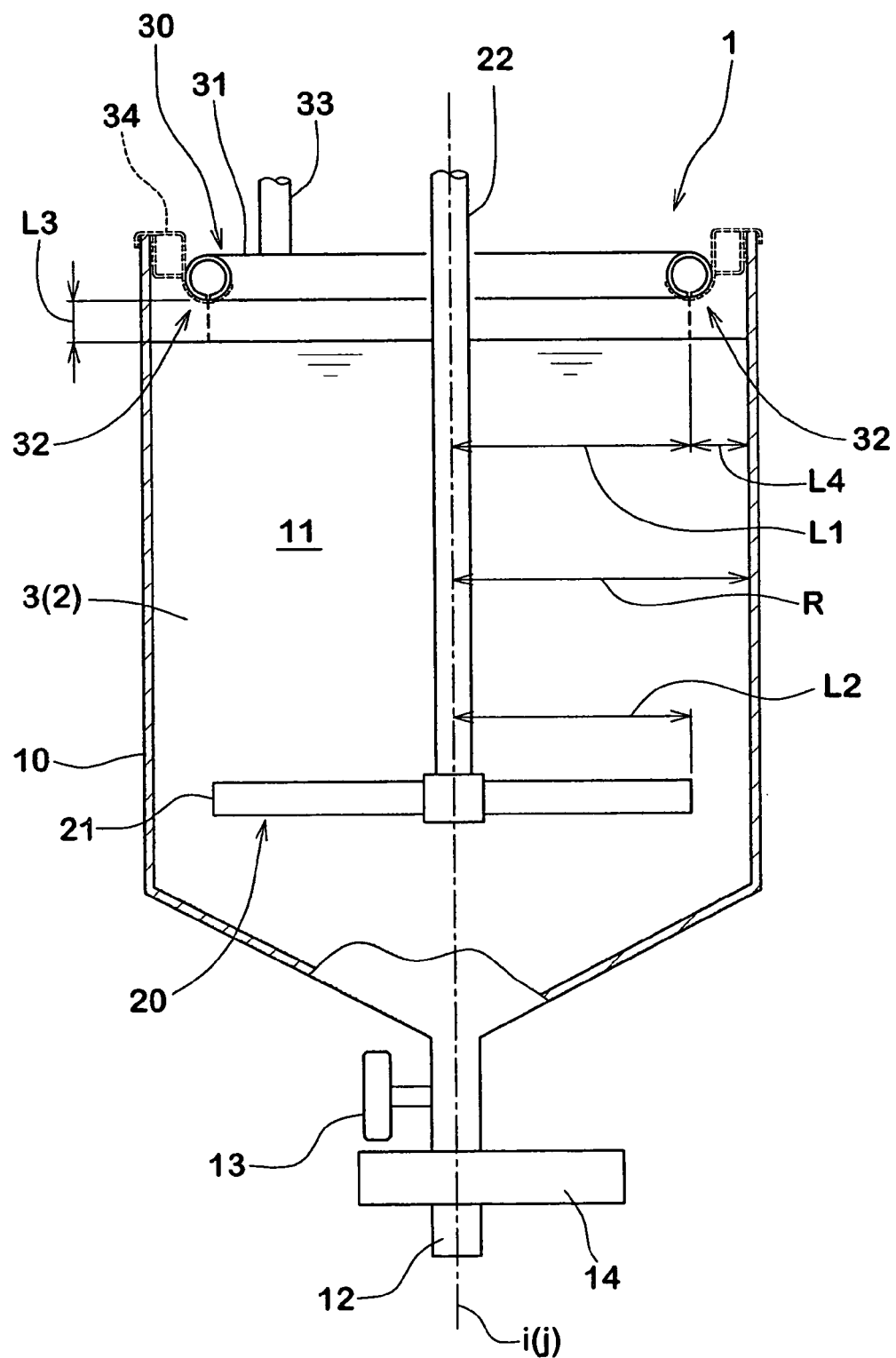
FIG. 1 is a schematic partial sectional view for explaining a device and a method for making a tire puncture sealant according to the present invention.

According to the present invention, a tire puncture sealant comprises rubber latex, a tackifier and propylene glycol $C_3H_8O_2$ as an antifreezing agent.

The content of the rubber latex is set in a range of from about 40 weight % to about 60 weight % of the overall weight of the puncture sealant. For the rubber latex, natural rubber latex is preferably used for its good sealing effect. Especially, deproteinized natural rubber latex is preferable because the amount of ammonia which is better to be added to prevent decomposition of proteins can be lessened. As a result, the occurrence of corrosion of tire cords and the irritating smell are reduced. Also it is possible to use synthetic rubber latex in combination with natural rubber latex, for example, latex of styrene-butadiene rubber, acrylonitrile-butadiene rubber, ethylene-vinyl acetate rubber, chloroprene rubber, vinyl pyridine rubber, butyl rubber and the like. In any case, the proportion of rubber solid content in the rubber latex is preferably set in the range of about 50 weight % to about 70 weight % of the overall weight of the rubber latex.

The tackifier is added to improve the adhesion of the rubber globules of the latex to the puncture hole of the tire when the sealant is injected. For the tackifier, terpene resin, phenolic resin, polyvinyl ester, polyvinyl alcohol, polyvinyl pyrrolidone and the like are preferably used. But, especially, terpene resin and phenolic resin are preferably used. The content of the resin tackifier is preferably set in the range of from about 10 weight % to about 30 weight % of the overall weight of the puncture sealant. If the content of the resin tackifier is less than 10 weight %, the puncture sealant becomes decreased in the self-bonding properties, and the sealing itself and the retaining of the sealing effect become insufficient. If the content of the resin tackifier is more than 30 weight %, as the content of the rubber latex decreases relatively to that of the resin tackifier, the sealing power becomes decreases.

Further, the puncture sealant includes a stabilizer. For the stabilizer, a surface active agent, e.g. an anionic surface active agent, ampholytic surface active agent, special carboxylic acid active agent and the like, is used. The content thereof is set in a range of from about 0.4 weight % to about 2.0 weight % of the overall weight of the puncture sealant. By the ion repulsive force of the surface active agent, the rubber globules and the tackifier resin globules are uniformly dispersed in the aqueous solution, and this state can be kept stably over the long term.

According to the present invention, in order to make the freezing point of the puncture sealant below 30 degrees centigrade for example, the content of the propylene glycol is set in the range of about 25 weight % to about 35 weight % of the overall weight of the puncture sealant. Such a higher concentration of propylene glycol also provides another advantage such that the natural rubber globules are prevented from rising to the surface and becoming creamy in the storage container because the propylene glycol has a specific gravity which is close to that of the natural rubber globules.

The puncture sealant is thus a milky aqueous fluid whose viscosity is about 25 cps to about 35 cps in which the rubber globules and the resin tackifier globules are uniformly dispersed in the aqueous solution of propylene glycol by the ion repulsive force of the surface active agent.

Here, propylene glycol is a viscous liquid which is very amalgamative with water. Therefore, if propylene glycol is poured over the rubber latex, then, water in the latex near the interface between the latex and propylene glycol is absorbed, and the density of the rubber globules becomes very high near the interface. As a result, coagulum is very liable to be produced, and such becomes unusable as a puncture sealant.

According to the present invention, therefor, in order to prevent the formation of coagulum of rubber latex, the sealant is manufactured as follows.

First, the rubber latex and tackifier are mixed into a mixed solution. Then, during stirring the mixed solution, the propylene glycol is poured on the surface of the mixed solution whose current speed F at the surface is in the range of from 1.0 to 10.0 meter/second, preferably 2.0 to 7.0 meter/second relatively to spouts for the propylene glycol at a rate of 0.01 to 1.0 liter/minute preferably 0.02 to 0.8 liter/minute per spout.

FIG. 1 shows a device 1 for making the puncture sealant 2 according to the present invention.

The device 1 comprises a container 10, an agitator 20 and a squirter 30.

The container 10 has a cylindrical space 11 that the mixed solution 3 is let into. The cylindrical space 11 has a inside radius R. The bottom thereof is funnel-shaped, and an exhaust 12 being openable and closable by a valve 13 is formed at the center thereof.

The agitator 20 comprises a stirring blade 21 attached to the end of a rotary shaft 22 and put into the cylindrical space 11 at a certain depth, and a driving motor (not shown) connected to the other end of the rotary shaft 22 to rotate the stirring blade 21 at a programmed rotating speed. The stirring blade 21 has the center of rotation (j) at the center (i) of the cylindrical container 10. The length L2 of the blade 11 between the tip and the center, namely, radius is preferably set in a range of from 60 to 90% of the inside radius R of the cylindrical space 11 to facilitate the circulation of the solution and efficient mixing. If the length L2 is less than 60% of the radius R, it becomes difficult to achieve efficient mixing. If the length L2 is more than 90%, the circulation is liable to become insufficient.

Figure 2:
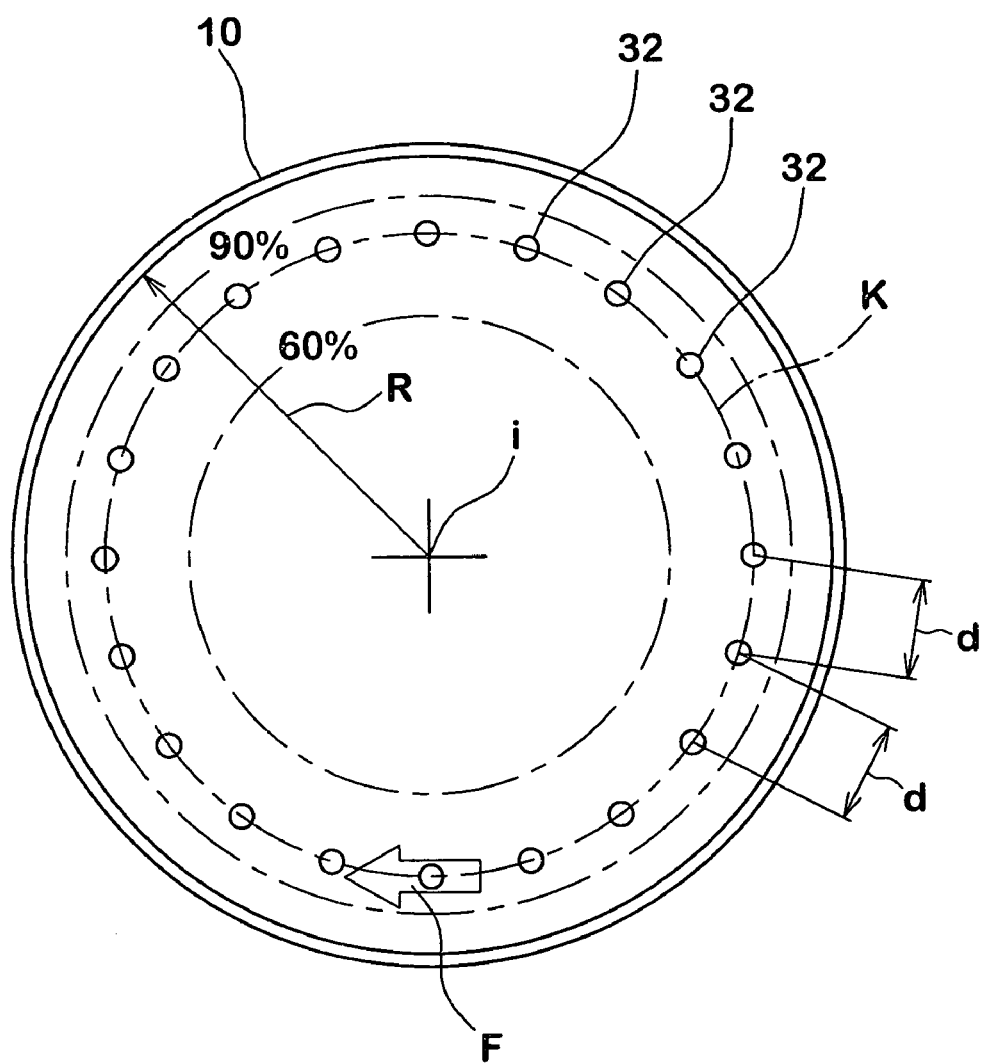
FIG. 2 is a diagram showing an example of the arrangement of the spouts for propylene glycol.

The squirter 30 comprises an annular tube 31 provided on the undersurface with the spouts 32, and a feed pipe 33 extending from a tank (not shown) of the propylene glycol is connected to the annular tube 31. The annular tube 31 is supported concentrically with the center (i) of the cylindrical space 11 by a holder 34 secured to the side wall of the container 10. The spouts 32 are each positioned at a height L3 from the surface of the mixed solution 3. The height L3 must be more than 1 cm even when the surface is risen maximally by adding the ingredients. As to the horizontal location, the spouts 32 are each positioned at a distance L1 of from the center line (i) of the cylindrical space 11. Further, the spouts 32 are each positioned at a distance L4 from the surface of the side wall of the cylindrical container 10. The distance L4 must be more than 1 cm. Furthermore, as shown in FIG. 2, the spouts 32 are preferably placed in an annular range between 60% and 90% of the inside radius R of the cylindrical space 11.

In this example, the spouts 32 are arranged at regular intervals on a circle K which is concentric with the cylindrical space 11, and the distance (d) between the spouts 32 is set in the range of more than about 50 mm. The above-mentioned distance L1 is the substantially same as the blade length L2. But, these may be different values.

If the height L3 is very low or zero, the concretion of the antifreezing agent adheres around the spouts 32.

If the distance L4 is very short or zero and/or the location of the spouts 32 is beyond the 90% border line of the radius R, then the density of propylene glycol becomes higher along the surface of the side wall than the central part, and accordingly, rubber coagulum is formed and the concretion is liable to adhere on the surface of the side wall. As a result, efficient stirring becomes impossible in the shortest time in use. If the location of the spouts 32 is inside the 60% border line of the radius R, then the formation of rubber coagulum increases as the current speed of the solution is slow and the spreading of the poured propylene glycol is inert.

As previously stated in brief, the mixed solution 3 is first made by mixing the rubber latex and tackifier in the cylindrical container 10.

It is possible to pour the ready-mixed solution 3 into the cylindrical container 10, but in this embodiment, using the cylindrical container 10 and agitator 20, the mixing is made by putting the rubber latex, tackifier, stabilizer and additives therein, and rotating the blade 21 at a certain rotating speed.

Then, during stirring the mixed solution 3 by rotating the stirring blade 21 at a specific rotating speed, propylene glycol is poured as an antifreezing agent, on the surface of the mixed solution 3 swirling about the center (i).

As long as propylene glycol is being poured, the stirring blade 21 is rotated at a relatively high speed by which the current speed F of the mixed solution 3 at the above-mentioned surface (the pour position) becomes in the range of from 1.0 to 10.0 meter/second, preferably 2.0 to 7.0 meter/second relatively to the spouts 32.

Depending on the distance between the surface and the stirring blade 21, when the distance is not so far, the rotating speed of the stirring blade 21 can be set such that the speed of the stirring blade 21 at the tip thereof becomes almost the same as the above-mentioned current speed F, namely, in the range of from 1.0 to 10.0 meter/second, preferably 2.0 to 7.0 meter/second. Under this condition, in order to avoid the formation of rubber coagulum, the propylene glycol is poured through the spouts 32 at a relatively slow rate of 0.01 to 1.0 liter/minute preferably 0.02 to 0.8 liter/minute per spout 32. The total pouring rate for all the spouts 32 is however, set in a range of 0.5 to 20 liter/minute in order to speed up the pouring process.

If the speed is lower than 1.0 meter/second and/or the pouring rate is more than 1.0 liter/minute per spout 32, then the rubber coagulum is formed at a higher percentage. If the speed is faster than 10.0 meter/second, the mixed solution 3 spatters and a problem of cavitation tends to arise and a stable efficient stirring is difficult. If the pouring rate is less than 0.01 liter/minute, the pouring time is prolonged and the production efficiency decreases.

Since it is almost impossible to completely prevent the occurrence of a very small coagulum of rubber, after the pouring of propylene glycol has been finished, the stirring is continued for a certain time (for example, five or more minutes per 15 liters) by rotating the blade at a relatively slow speed to intentionally agglutinate very small coagula into relatively large but absolutely small coagula so as to be able to remove them by a filter 14 with relatively large meshes thus whose the resistance to flow is low. (hereinafter, the "post-pouring stirring" for agglutination)

The following Table 1 shows a variation of the total weight of rubber coagulum formed when 1,000 litters of the following puncture sealant was made changing the conditions as set forth in the table. In Table 1, the weight of the formed coagulum which was obtained by filtration subsequent to the ten minute post-pouring stirring, is indicated by a ratio to the total weight of the rubber component in the puncture sealant.

TABLE 1

|  | Ex. 1 | Ex. 2 | Ref. 1 | Ex. 3 | Ex. 4 | Ex. 5 | Ex. 6 | Ref. 2 | Ex. 7 | Ex. 8 | Ref. 3 |
|---|---|---|---|---|---|---|---|---|---|---|---|
| L1 (cm) | 25 | 35 | 50 | 45 | 45 | 45 | 45 | 45 | 45 | 45 | 45 |
| L1/R (%) | 50 | 70 | 100 | 90 | 90 | 90 | 90 | 90 | 90 | 90 | 90 |
| Pouring rate (liter/minute) | 0.1 | 0.1 | 0.1 | 0.02 | 0.2 | 0.9 | 1 | 0.1 | 0.1 | 0.1 | 0.1 |
| Blade tip speed (meter/minute) | 8 | 8 | 8 | 8 | 8 | 8 | 8 | 0.5 | 1.2 | 8 | 11 |
| Post-pouring stirring time (minte) | 10 | 10 | 10 | 10 | 10 | 10 | 10 | 10 | 10 | 10 | 10 |
| Coagulum | 1 | 0.15 | 10 | 0.1 | 0.15 | 0.25 | 0.28 | 0.35 | 0.25 | 0.2 | 0.5 |

1) Ingredients of the puncture sealant:

Deproteinized natural rubber latex: 50 weight %
Terpene resin (tackifier): 20 weight %
Propylene glycol (antifreezing agent): 30 weight %

2) Specifications of the device 1 used:

Capacity of the container 10: 1000 liters
Radius R of the container 10: 50 cm
Length L2 of Stirring blade 21: 40 cm
Diameter of Spout 32: 2 mm
Number of spouts 32: 20

The invention claimed is:

1. A method for making a tire puncture sealant having a higher concentration of propylene glycol, the method comprising
    preparing a mixed solution of rubber latex and a tackifier in a cylindrical space of a container,
    pouring propylene glycol on the surface of the mixed solution through a plurality of spouts at a rate of 0.01 to 1.0 liter/minute per spout, and
    agitating the mixed solution in the container to cause in said surface a current speed of the mixed solution in a range between about 1.0 and about 10.0 meter/second during pouring of the propylene glycol.

2. The method according to claim 1, wherein the tire puncture sealant comprises
    40 to 60 weight % of natural rubber latex whose rubber solid content is in a range of 50 to 70 weight %,
    10 to 30 weight % of a resin tackifier, and
    25 to 35 weight % of propylene glycol.

3. The method according to claim 1, wherein said pouring of the propylene glycol through said plurality of spouts is carried out at a rate in a range of 0.5 to 20 liter/minute in totality.

4. The method according to claim 1, wherein
    said current speed is in a range of 2.0 to 7.0 meter/second, and
    the pouring rate of each said spout is in a range of 0.02 to 0.8 liter/minute.

5. The method according to claim 1, wherein the distance between the spouts is in a range of more than about 50 mm.

6. The method according to claim 1, wherein said plurality of spouts are positioned within an annular range between about 60% and about 90% of a radius R of said cylindrical space.

7. The method according to claim 1, which further comprises positioning said plurality of spouts at a height of more than 1 cm from the surface of the mixed solution.

8. The method according to claim 1, wherein said plurality of spouts are positioned at a distance of more than 1 cm from the surface of the side wall of the cylindrical space.

9. The method according to claim 1, wherein said plurality of spouts are positioned at regular intervals on a circle which is concentric with the cylindrical space.

* * * * *